United States Patent
Han

(10) Patent No.: US 6,602,567 B2
(45) Date of Patent: Aug. 5, 2003

(54) MICROMETER-SIZED CARBON TUBES

(76) Inventor: Chien-Chung Han, Department of Chemistry, National Tsing Hua University, Hsinchu (TW)

( * ) Notice: Subject to any disclaimer, the term of this patent is extended or adjusted under 35 U.S.C. 154(b) by 0 days.

(21) Appl. No.: 09/985,338

(22) Filed: Nov. 2, 2001

(65) Prior Publication Data

US 2002/0048644 A1 Apr. 25, 2002

Related U.S. Application Data

(62) Division of application No. 09/401,048, filed on Sep. 22, 1999, now Pat. No. 6,506,323.

(51) Int. Cl.⁷ .................................................. B32B 1/08
(52) U.S. Cl. .............. 428/36.9; 428/36.91; 428/311.51; 428/398; 428/408; 428/903
(58) Field of Search ............................ 428/36.9, 36.91, 428/311.51, 398, 408, 903

(56) References Cited

U.S. PATENT DOCUMENTS

| | | | |
|---|---|---|---|
| 3,887,747 A | * 6/1975 | Tamura et al. .............. 442/193 |
| 5,346,683 A | * 9/1994 | Green et al. .............. 423/447.2 |
| 5,352,512 A | * 10/1994 | Hoffman ................. 428/311.51 |
| 6,143,412 A | * 11/2000 | Schueller et al. ........... 428/408 |

* cited by examiner

*Primary Examiner*—Harold Pyon
*Assistant Examiner*—Chris P Bruenjes
(74) *Attorney, Agent, or Firm*—W. Wayne Liauh

(57) ABSTRACT

A carbon tube containing a carbonized tube wall. The tube wall is consisted of carbonized coating material and trace of fiber residue, and the carbonized coating material is prepared according to a process including the steps of: (a) coating a fiber structure with a carbon-containing coating material to form a coating layer over the fiber structure; (b) removing the fiber structure; and (c) carbonizing the coating layer to form the carbonized tube wall. The fiber structure can be either a two-dimensional or three-dimensional object, and a two-dimensional or three-dimensional device can be prepared accordingly. The carbon-containing coating material can be made of repeating units of substituted polyacrylonitriles, unsubstituted polyacrylonitriles, substituted poly(vinyl chlorides), unsubstituted poly(vinyl chlorides), substituted poly(vinyl acetates), or unsubstituted poly(vinyl acetates), or it can be made of conjugated polymers including doped and undoped conjugated homopolymers, doped and undoped conjugated copolymers.

12 Claims, 6 Drawing Sheets

(IX)

(X)

(XI)

(XII)

(XIII)

(XIV)

(XV)

(XVI)

(XVII)

(XVIII)

(XIX)

(XX)

(XXI)  (XXII)  (XXIII)  (XXIV)

MICROMETER-SIZED CARBON TUBES

This application is a divisional of application Ser. No. 09/401,048, which was filed on Sep. 22, 1999, now U.S. Pat. No. 6,506,323.

FIELD OF THE INVENTION

The present invention generally relates to carbon tubes, and more particularly, a method for making micrometer-sized carbon tubes.

BACKGROUND OF THE INVENTION

Carbon tubes have various applications in the art. General applications of carbon tubes are found in medical research, semiconductors and microelectronics. Various methods of manufacturing carbon tubes are available in the art, including carbon arc discharge, laser ablation, condensed-phase electrolysis, and catalytic pyrolysis of hydrocarbons on various substrates such as porous anodic aluminum oxide, fine metal particles, and patterned cobalt layer.

A significant function of carbon tubes is the allowance of reactants to flow through their cavities. The inner surface of the cavities in carbon tubes can be modified by chemical treatment. The chemical treatment renders the inner surface of the cavities active with desired affinity, thereby enabling selective separation or extraction of compounds. In addition, by embedding certain transition metal complexes on the inner surface of the cavities, desired catalytic functions can be implemented.

A shortcoming of conventional methods of manufacturing small-sized carbon tubes is the inability to produce a hollow carbon tube with opening ends. This shortcoming significantly limits the capability of the carbon tube for applications that utilize the inner surface and inner space of the tubes for, e.g., selective separation or extraction of compounds, catalytic reactor or micro-reactor applications. Another shortcoming of conventional methods is the inability to produce a carbon tube with appreciable length (i.e., longer than about 1 mm), while retaining control of the tube wall thickness, the inner and outer diameters of the tubes. Yet another shortcoming of conventional methods is the inability to produce a tube with long-range three-dimensional regularity. These shortcomings have significant negative impact on practicing numerous, important applications of the carbon tubes.

Therefore, there is a need in the art for a method for making small-sized open-ended hollow carbon tubes of appreciate length with long-range regularity having effective control on the tube wall-thickness, the inner and outer tube-diameters thereof.

SUMMARY OF THE INVENTION

The present invention is related to a method for making micrometer-sized carbon tubes. More particularly, the method of the present invention comprises the steps of:
(a) coating a natural or synthetic fiber with a coating material, wherein the fiber is removable by thermal, solvent, or chemical treatment(s), or a combination thereof; and
(b) removing the fiber totally or partly, and carbonizing the coating layer and any residual fiber material.

According to a preferred embodiment of the present invention, a thermally removable polymer fiber and a material that is more thermally stable than the polymer fiber are provided. The polymer fiber is coated with the thermally stable material. The coating is carbonized and the polymer fiber is removed as a result of the carbonization process. Carbon tubes of micrometer size are then formed.

BRIEF DESCRIPTION OF THE DRAWINGS

Other features and advantages of the present invention will be apparent from the following detailed description when read in conjunction with the accompanying drawings, in which like reference designations represent like features throughout the enumerated Figures. The drawings are not drawn to scale, unless specifically noted as such, the emphasis being placed on illustrating the principles of the present invention. In the accompanying drawings.

DETAILED DESCRIPTION OF THE PREFERRED EMBODIMENTS

Reference is now made in detail to an embodiment of the invention that illustrates the best mode presently contemplated by the inventors forpracticing the invention. Other embodiments are also described herein.

Figure 1:
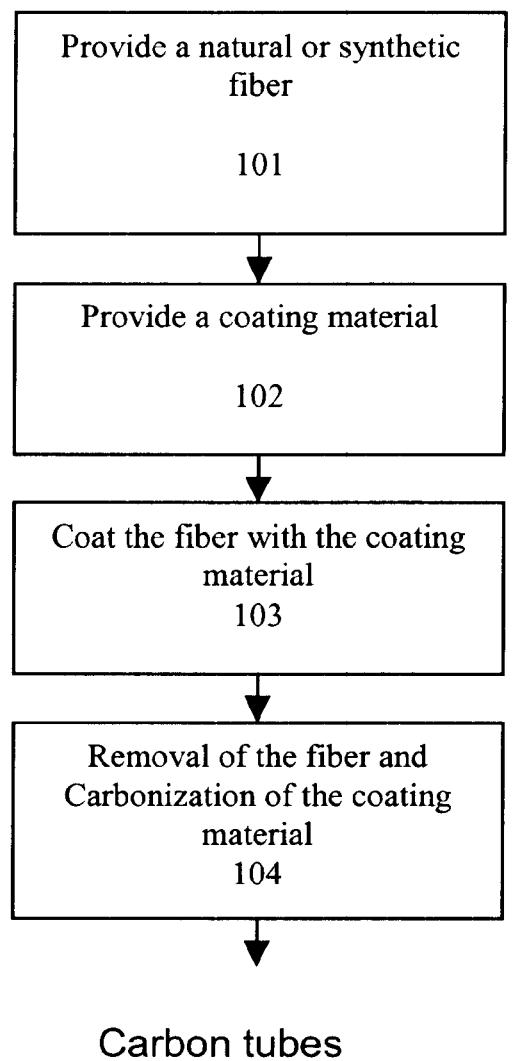
FIG. 1 is a flow diagram illustrating the general method of the present invention.

FIG. 1 is a flow diagram that illustrates the general methodology of the present invention. Referring to FIG. 1, a natural or synthetic fiber is provided as the core fiber in Step 101. Referring to Step 102, a coating material is provided. The fiber is coated with such coating material in Step 103. The fiber is removed and the coating is carbonized (Step 104). Carbon tubes of micrometer-sized are then formed. The diameter and the wall thickness of the carbon tubes can be controlled by controlling the diameter of the fiber and the thickness of the coating material. The core fiber of the composite fiber in Step 104 can be removed by thermal, solvent, or chemical treatments, or a combination thereof. A thermal treatment is preferred for removing the core fiber. The coating material (Step 102) is preferred to be more thermally stable than the core fiber.

Figure 2:
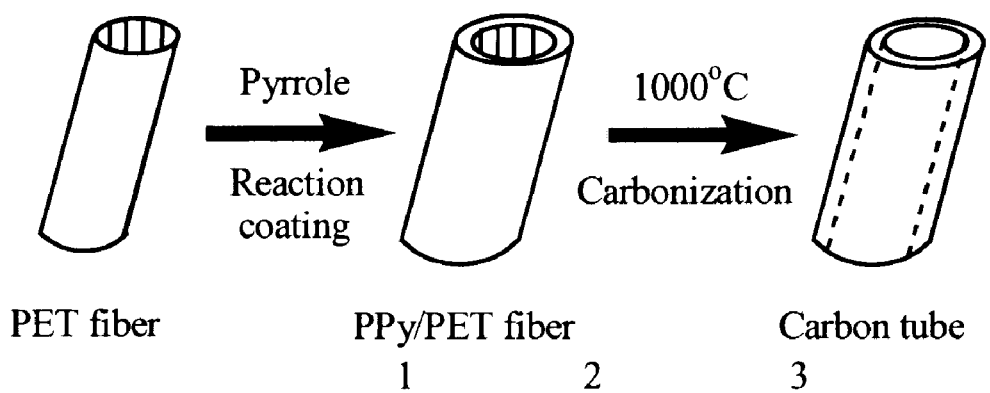
FIG. 2 is a flow diagram illustrating a specific embodiment of the present invention.

FIG. 2 is a flow diagram that illustrates a specific embodiment of the present invention. Referring to FIG. 2, a thermally removable polymer such as polyethylene terephathlate (PET) is provided in Step 1. The PET serves as the growing template to produce a coated polymer fiber. Any thermally removable, natural or synthetic fiber can be used as the growing template. Natural fibers that can be used as the growing template include silk, cotton, cellulose fiber, vegetable fiber, wool, and hair. Synthetic fibers that can be used as the growing template can be made from thermoplastic and thermosetting polymers. Thermoplastic or thermosetting polymers can also be used as the coating material, provided that the selected polymer coating material is more thermally stable than the core fiber. Other thermally stable materials suitable for use as the coating material can be selected from backbone conjugated polymers.

A conjugated polymer, such as polypyrrole (PPy), is grown on the PET fiber as the coating layer to produce a composite fiber, i.e., PPy/PET fiber (Step 2). Any other material, such as organic polymers, having a higher thermal stability than that of the core fiber (e.g., PET) can also be used as the coating material. In the present embodiment, conjugated conducting polymers or polyacrylonitrile are preferred to be used as the coating material. The conjugated polymers as used in the present embodiment, can either be in the neutral, undoped forms (i.e., nonconductive form) or in the conductive, doped forms having any doping degree.

Any method suitable for preparing composite fibers having a coating/core configuration can be used, including co-extrusion, coating, and casting. The composite fiber with a similar coating/core configuration can also be prepared from a single-component material fiber, providing that the core fiber is first subjected to some chemical and/or physical pre-treatments, such as radiation-treatment to induce a cross-linking reaction on its surface, to change the chemical or physical property of its surface layer so that its core can be selectively removed by a subsequent treatment, such as by a thermal treatment, or by dissolution with a solvent. Coating methods for forming the coating on the PET include reaction coating, solution coating, dipping, casting, melt coating, spray coating, spin coating, brush coating, and thermal evaporation coating. A preferred coating method in the present embodiment is to employ a reaction coating process for preparing the composite fiber. For example, a composite PET fiber having a polypyrrole coating layer can be prepared by placing the PET fiber in a reaction solution that contains pyrrole, which is the monomer of the polypyrrole (PPy) coating, and a chemical reagent for inducing the polymerization of the monomer. The PPy coating is applied by suspending the PET polymer fiber in an aqueous pyrrole solution that contains two equivalents of protonic acid, such as toluene-p-sulfonic acid. Oxidants, such as $FeCl_3$ or ammonium persulfate, are then added to the solution to initiate the polymerization of pyrrole. A homogeneous, dark black PPy coating is formed on the surface of the PET, and the composite PPy/PET fiber is formed. The thickness of the PPy coating is controlled by altering the pyrrole concentration of the reaction solution, and by controlling the number of reaction coating treatments.

Any oxidant that is capable of inducing oxidative polymerization can be used. The nature of such oxidants varies widely depending on the monomer employed. Illustrative of oxidants for use in the present invention include ammonium persulfate, potassium persulfate, sodium persulfate, sodium dichromate, potassium permanganate, chromic acid, hydrogen peroxide, ferric chloride, potassium dichromate, and the like.

Other types of chemical reagents can also be used as long as they are capable of initiating or inducing the polymerization of the monomer. The nature of the chemical reagent varies widely depending on the monomer employed. Chemical reagents that can be used in the present invention include the reagents or initiators that initiate or induce the monomer polymerization via cationic, anionic, radical (or a combination thereof), or any other intermediates known in the art. Other useful reaction agents or chemical reagents include photon, heat, oxygen, air, moisture, or transition metal-containing catalysts.

The composite fiber with a coating/core configuration can also be formed using a solution coating method. If solution-coating is employed, a solution of the polymeric materials for the coating layer is used. For example, a composite fiber having PET as the core fiber material and polyacrylonitrile as the material for the coating layer can be prepared using a solution coating process by dipping a PET fiber with a polyacrylonitrile solution in DMSO (dimethylsulfoxide). The dipped fiber is then dried in air or under dynamic vacuum to form the desired composite fiber. The thickness of the coating is controlled by controlling the concentration of the polyacrylonitrile solution, the dipping rate, and the number of dipping treatments.

Referring to Step 3, a carbon tube is formed after a carbonization process is applied. The PPy/PET fiber undergoes thermal treatment, which removes the PET fiber to form the carbon tube. Other physical and/or chemical treatments, such as dissolution by a solvent, can also be used as long as it removes the core fiber totally or partly from the composite fiber. A carbon tube of appreciable length (up to several centimeters long) is then formed, with a controllable tube wall thickness ranging from less than 100 nm to several micrometers, and a tube diameter in the range of 1 to 100 micrometers.

The physical and/or chemical treatment can be a single-step process or a series of combination steps, as long as at least one of the steps removes the core fiber totally or partly to convert the composite fiber into a tube-shape material, and at least one of the steps carbonize the composite fiber to form a carbon-rich material. In the present embodiment, the composite fiber is subjected to a thermal treatment, or a solvent treatment, to remove totally or partly the core fiber, followed by a thermal treatment to carbonize the remaining material of the composite fiber to form the carbon tube.

As for the thermal treatment, the core material can be removed by melting, subliming, vaporizing, decomposing, or any combination of such physical and/or chemical transformation(s). In the present embodiment, the composite (PPy/PET) fiber is heated to a temperature at least higher than the melting and/or decomposition temperature of the core fiber. The thermal treatment process can be performed under any atmosphere as long as the composite fiber will not be totally removed. The pressure of such atmosphere can be greater or less than 1 atm (atmosphere), depending on the requirements for processing the composite fiber of different types. Preferably, the thermal treatment is performed under an inert atmosphere such as $N_2$, Ar, He, Ne, or a combinations thereof. The thermal treatment can also be performed in vacuum conditions. The reactive atmosphere, such as air or oxygen, can also be used in combination with the above noted atmosphere as long as such treatment can either enhance the thermal stability of the coating or facilitate the thermal decomposition of the core fiber. For instance, a composite fiber, having PET as the core material and polyacrylonitrile as the coating, is pretreated in air at 200 to 300° C. to enhance the thermal stability of the polyacrylonitrile coating. Another thermal treatment in a nitrogen atmosphere at higher temperatures is subsequently performed to remove the core PET material and carbonize the oxygen-treated polyacrylonitrile coating.

In the present embodiment, the PPy-coated PET fibers are first slurry-washed with a copious amount of deionized water and air-dried for 48 hours. The carbon tubes are prepared from PPy coated PET fibers by heating the composite PPy/PET fibers from room temperature up to 1000° C. at a heating rate of 10 Celsius per minute (° C./min), and staying at 1000 degrees Celsius (° C.) for 3 to 24 hours in a nitrogen atmosphere with a nitrogen flow rate of 0.5 liters per minute.

The present invention enables the preparation of two- or three-dimensional regular structures assembled by the carbon tubes by the use of woven growing templates, enabling easier design and fabrication of articles for practical applications. The two- or three-dimensional carbon tube structures can easily be made, up to several centimeters in length, using the method of the present invention. Such long range and highly regular carbon tube structures are otherwise extremely difficult to obtain using conventional methods of manufacturing small-sized carbon tubes. The coating can be formed on, e.g., a three-dimensionally woven matrix of core fibers. Once the method of the invention is implemented thereon, a three-dimensional structure of carbon tubes is formed. The carbon tubes formed according to the present invention can either be in the form of individually separated tubes or an assembled structure, which is particularly useful in practical applications. For example, individually separated carbon tubes can be prepared from PPy-coated PET fibers. An assembled structure of three dimensionally woven carbon tubes can also be formed from PPy-coated PET fabric cloth.

The micrometer-sized carbon tubes formed according to the present invention, with their relatively large inner diameter, allow reactants to easily flow through their cavities. When the inner surface is modified using chemical treatment to render the inner surface active with desired affinity, compounds can be selectively separated (or extracted). Desired transition metal complexes (with sizes often larger than 2–3 nm) can be easily embedded on the inner surface of the micrometer-sized carbon tubes to impart specific catalytic functions. The throughput of micrometer-sized carbon tube micro-reactors is optimized with the larger inner tube diameter.

The tube length, tube wall thickness and tube diameter of the carbon tubes formed according to the present invention can be controlled. The tube can be obtained in any desired length ranging from a length less than 1 nanometer to several centimeters. Note that there is no upper limit in the tube length that can be formed, so long as the core material can be effectively removed by the thermal or solvent treatment.

The tube wall thickness of the carbon tubes formed according to the present invention can be controlled by controlling the thickness of the coating of the composite fiber. According to the present invention, the tube wall thickness can be obtained in any desired size, ranging from a thickness of less than 50 nm to greater than several hundred micrometers. Carbon tubes with a wall thickness less than 50 nm can also be prepared using the method of the present invention, as long as a core fiber of less than approximately 1 micrometer in diameter is employed. Note that there is no upper limit in the tube wall thickness that can be formed, depending upon the requirements of the specific application.

The tube diameter of the carbon tubes formed according to the present invention can also be controlled by controlling the diameter of the core fiber. Any desired tube diameter can be obtained, depending on the particular natural or synthetic fiber used as the core fiber. According to the present invention, the tube diameter can be obtained in any desired size, ranging from a diameter less than 1 micrometer to greater than several hundred micrometers. Note that there is no lower or upper limit on the tube diameter that can be formed, depending on the particular material used as the core, and the requirements of the specific application.

Although the composition of the carbon tubes formed according to the present invention is rich in carbon, it is not limited to carbon composition only. Other elements can also co-exist in the carbon tubes. The amount and type of such co-existing elements can vary widely, depending on the material used and the treatment process employed for forming the carbon tubes. Preferably, the carbon tubes formed according to the present invention contain equal to or greater than approximately 40 to 60 weight percentage (wt %) of carbon. Carbon tubes that contain equal to or greater than 50–70 wt %, 60–80 wt %, and 70–90 wt % of carbon can also be formed using the method of the present invention.

The phase of the carbon material in the carbon tubes formed according to the present invention can vary widely depending on the materials used and the thermal treatment employed. The phase of the carbon materials can be amorphous, crystalline, turbostratic, graphitic or any phase combination thereof.

The carbon tubes formed according to the present invention can be used for any purpose for which carbon tubes are useful. Examples of useful applications include electron field emitters, nano- or micro-wires, nanometer- or micrometer-sized chemical probes, natural gas storage, catalytic micro-reactors and biosensors. The carbon tubes can also be used as the carbon electrodes for lithium batteries, fuel cells, electrochemical cells, and capacitors. In addition, the carbon tubes are useful as reinforcement materials. In particular, for micrometer-sized carbon tubes, with their relatively larger inner diameter, inner surface modifications can be efficiently implemented using chemical treatment to render the inner surface active, thus enabling selective separation (or extraction) of interested compounds.

A. Illustrative Examples of Thermoplastic and Thermosetting Polymers

Illustrative of organic polymers for the core fiber and the coating material for use in the present invention are thermoplastic and thermosetting polymers. Thermosetting polymers that can be used in the present invention can vary widely. Illustrative of such useful thermoset polymers are alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; amino resins such as those produced by addition reaction between formaldehyde and such compounds as melamine, urea, aniline, ethylene urea, sulfonamide and dicyanodiamide; epoxies such as epoxy phenol novolak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene diisocyanate, 2,4-tolylene diisocyanate, 4,4'-diphenylmethane diisocyanate, 1,6-hexamethylene diisocyanate and 4,4'-dicyclohexylmethane diisocyanate with a polyol such as polyether polyol (trimethylol propane, 1,2, 6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Thermoplastic polymers that can be used in the present invention vary widely. Illustrative of such thermoplastic polymers include polyesters such as poly(glycolic acid), poly(ethylene succinate), poly(ethylene adipate), poly(tetramethylene adipate), poly(ethylene azelate), poly(ethylene sebacate), poly(decamethylene adipate), poly(decamethylene sebacate), poly(1,2-dimethylpropiolactone), poly(pivaloyl lactone), poly(para-hydroxybenzoate), poly(ethylene oxybenzoate), poly(ethylene isophthalate), poly(ethylene terephthalate), poly(decamethylene terephthalate), poly(hexamethylene terephthalate), poly(1,4-cyclohexane dimethylene terephthalate), poly(ethylene-1,5-naphthalate), poly(ethylene-2,6-naphathalate), poly(1,4-cyclohexylidene dimethylene-terephthalate) and the like; polyamides such as poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9- aminononanoic acid) (nylon 9), poly(10-aminodecanoic acid) (nylon 10), poly(11-aminoundecanoic acid) (nylon 11), poly(12-aminododecanoic acid) (nylon 12), poly (hexamethylene adipamide) (nylon 6,6), poly (heptamethylene pimelamide) (nylon 7,7), poly (octamethylene sebacamide) (nylon 8,8), poly (hexamethylene sebacamide), (nylon 6,10), poly (nonamethylene azelamide) (nylon 9,9), poly (decamethylene azelamide) (nylon 10,9), poly (decamethylene sebacamide) (nylon 10,10), poly[bis(4-aminocyclohexyl)methane-1,10-decanedicarboxamide] (Quiana) (trans), poly(m-xylene adipamide), poly(p-xylene sebacamide), poly(2,2,2-trimethylhexamethylene terephthalamide), poly(piperazine sebacamide), poly(meta-phenylene isophthalamide) (Nomex), poly(p-phenylene terephthalamide) (Kevlar), and the like; polycarbonates such as poly[methane bis(4-phenyl)carbonate], poly[1,1-ethane bis(4-phenyl)carbonate], poly[2,2-propane bis(4-phenyl) carbonate], poly[1,1-butane bis(4-phenyl)carbonate], poly [1,1-(2-methylpropane) bis(4-phenyl)carbonate], poly[2,2-butane bis(4-phenyl)carbonate], poly[2,2-pentane bis(4-phenyl)carbonate], poly[4,4-heptane bis(4-phenyl) carbonate], poly[1,1-(1-phenylethane) bis(4-phenyl) carbonate], poly[diphenylmethane bis(4-phenyl)carbonate], poly[1,1-cyclopentane bis(4-phenyl)carbonate], poly[1,1-cyclohexane bis(4-phenyl)carbonate], poly[thio bis(4-phenyl)carbonate], poly [2,2-propane bis-[4-(2-methyl phenyl)]carbonate], poly[2,2-propane bis-[4-(2-chlorophenyl)]carbonate], poly[2,2-propane bis-[4-(2,6-dichlorophenyl)]carbonate], Poly[2,2-propane bis-[4-(2,6-dibromophenyl)]carbonate], poly[1,1-cyclohexane bis-[4-(2,6-dichlorophenyl)carbonate], and the like; polymers derived from the polymerization of α,β-unsaturated monomers such as polyethylene, acrylonitrile/butadiene/styrene terpolymer, polypropylene, poly(1-butene), poly(3-methyl-1-butene), poly(1-pentene), poly(4-methyl-1-pentene), poly (1-hexene), poly(5-methyl-1-hexene), poly(1-octadecene), polyisobutylene, poly(isoprene), 1,2-poly(1,3-butadiene) (isotatic), 1,2-poly(1,3-butadiene) (syndiotatic), polystyrene, poly(α-methylstyrene), poly(2-methylstyrene), poly(4-methylstyrene), poly(4-methoxystyrene), poly(4-phenylstyrene), poly(3-phenyl-1-propene), poly(2-chlorostyrene), poly(4-chlorostyrene), poly(vinyl fluoride), poly(vinyl chloride), poly(vinyl bromide), poly(vinylidene fluoride), poly(vinylidene chloride), poly (tetrafluoroethylene) (Teflon), poly(chlorotrifluoroethylene), poly(vinyl cyclopentane), poly(vinyl cyclohexane), poly(α-vinyl naphthalene), poly(vinyl alcohol), poly(vinyl methyl ether), poly(vinyl ethyl ether), poly(vinyl propyl ether), poly(vinyl isopropyl ether), poly(vinyl butyl ether), poly (vinyl isobutyl ether), poly(vinyl sec-butyl ether), poly(vinyl tert-butyl ether), poly(vinyl hexyl ether), poly(vinyl octyl ether), poly(vinyl methyl ketone), poly(methyl isopropenyl ketone), poly(vinyl formate), poly(vinyl acetate), poly(vinyl propionate), poly(vinyl chloroacetate), poly(vinyl trifluoroacetate), poly(vinyl benzoate), poly(2-vinyl pyridine), poly(vinyl pyrrolidinone), poly(vinyl carbazole), poly(acrylic acid), poly(methyl acrylate), poly(ethyl acrylate), poly(propyl acrylate), poly(iso-propyl acrylate), poly(butyl acrylate), poly(isobutyl acrylate), poly(sec-butyl acrylate), poly(tert-butyl acrylate), poly(methacrylic acid), poly(methyl methacrylate), poly(ethyl methacrylate), poly (propyl methacrylate), poly(isopropyl methacrylate), poly (butyl methacrylate), poly(isobutyl methacrylate), poly(sec-butyl methacrylate), poly(tert-butyl methacrylate), poly(2-ethylbutyl methacrylate), poly(hexyl methacrylate), poly (octyl methacrylate), poly(dodecyl methacrylate), poly (octadecyl methacrylate), poly(phenyl methacrylate), poly (benzyl methacrylate), poly(cyclohexyl methacrylate), poly (methyl chloroacrylate), polyacrylonitrile, polymethacrylonitrile, polyacrylamide, poly(N-isopropylacrylamide), and the like; polydienes such as poly (1,3-butadiene) (cis), poly(1,3-butadiene)(trans), poly(1,3-butadiene)(mixt.), poly(1,3-pentadiene)(trans), poly (2-methyl-1,3-butadiene) (cis), poly(2-methyl-1,3-butadiene) (trans), poly(2-methyl-1,3-butadiene)(mixt.), poly(2-tert-butyl-1,3-butadiene)(cis), poly(2-chloro-1,3-butadiene)(trans), poly(2-chloro-1,3-butadiene) (mixt.) and the like; polyoxides such as poly(methylene oxide), poly (ethylene oxide), poly(tetra-methylene oxide) poly(ethylene formal), poly(tetra-methylene formal), polyacetaldehyde, poly(propylene oxide), poly(hexene oxide), poly(octene oxide), poly(trans-2-butene oxide), poly(styrene oxide), poly(3-methoxypropylene oxide), poly(3-butoxypropylene oxide), poly(3-hexoxypropylene oxide), poly(3-phenoxy-propylene oxide), poly(3-chloropropylene oxide), poly[2,2-bis(chloromethyl)-trimethylene-3-oxide] (penton), poly(2,6-dimethyl-1,4-phenylene oxide) (PPO), poly(2,6-diphenyl-1, 4-phenylene oxide) (Texax, P30), and the like; polysulphides such as poly(propylene sulphide), poly (phenylene sulphide) and the like; polysulfones such as poly[4,4'-isopropylidene diphenoxy di(4-phenylene) sulphone]; noryl, and mixtures thereof.

In the preferred embodiments of the present invention, the useful organic polymer is a thermoplastic homopolymer or copolymer. Preferred thermoplastic polymers are nylons, polyesters, polycarbonates, poly(α-olefins), acrylics, methacrylics, substituted and unsubstituted polybutadienes, poly(vinyl halides), polysulfones, polyvinyl ethers, polyvinyl esters, poly(vinyl aromatics), poly(ethylene oxides), poly(vinyl alcohols), poly(vinyl acetates), and acrylonitrile/butadiene/styrene terpolymer.

More preferred thermoplastic substituted or unsubstituted homopolymer, or substituted or unsubstituted copolymers include substituted or unsubstituted nylons, substituted or unsubstituted polycarbonates, substituted or unsubstituted polyesters, substituted or unsubstituted poly(α-olefins), substituted or unsubstituted chlorinated poly(α-olefins), substituted or unsubstituted poly(butadienes), substituted or unsubstituted poly(vinyl halides), substituted or unsubstituted polysulfones, substituted or unsubstituted poly(vinyl ethers), substituted or unsubstituted poly(vinyl acetates), substituted or unsubstituted poly(vinyl alcohols), substituted or unsubstituted poly(ethylene oxides), acrylonitrile/butadiene/styrene terpolymer, substituted or unsubstituted polystyrenes; and most preferred thermoplastic polymers are poly(ethylene terephthalate), nylon-6, nylon-6,6, nylon-12, polycarbonate, poly(vinyl chloride), poly (chlorotrifluoroethylene), polyethylene terephthalate glycol, polyethylene, polypropylene, chlorinated polyethylene or polypropylene, polyisobutylene, polybutadiene, polystyrene, polyethylene oxide, acrylonitrile/butadiene/styrene terpolymer (ABS).

B. Illustrative Examples of Conjugated Conducting Polymer

Other preferred coating materials for the core fiber are electrically conductive backbone conjugated homopolymers or copolymers. Illustrative of such polymers are poly (unsaturated) polymers such as substituted or unsubstituted polyacetylenes; substituted or unsubstituted polyarylacetylenes; substituted or unsubstituted poly(heteroaromatics), such as polythiophenes, poly(furans), polypyrroles, polyquinolines, polyisothianaphthenes, polycarbazoles, poly(alkyl thiophenes) and the like; substituted or unsubstituted poly(aromatics) such as polyphenylene sulfides, polyanilines, polyphenylenes, polynaphthalenes, and polyperinaphthalenes, poly(azulenes) and the like; and substituted or unsubstituted poly(aromatic vinylenes) such as poly(phenylene vinylenes), poly(dimethoxy phenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like.

Preferred conjugated backbone homopolymer or copolymers are substituted or unsubstituted polyanilines, substituted or unsubstituted polyacetylenes, substituted or unsubstituted polyarylacetylenes, substituted or unsubstituted polypyrroles, substituted or unsubstituted poly (heterocycles), substituted or unsubstituted aromatic vinylenes, and substituted or unsubstituted heteroaromatic vinylenes. Illustrative of preferred homopolymers or copolymers of heterocycles, and aromatic or heteraromatic vinylenes are those comprising moieties of the Formulas I to XIV of FIGS. 3 and 4:

wherein:

m, and the sum of n, o, p and q are the same or different and are integers at least about 10, with the proviso that at least one of n or o is greater than zero;

$R'_1$, $R'_2$, $R'_3$, $R'_4$, $R'_5$, $R'_6$, $R'_7$, $R'_8$, $R'_9$, $R'_{10}$, $R'_{11}$, $R'_{12}$, $R'_{13}$, and $R'_{14}$ are the same or different at each occurrence and are hydrogen or isotopes thereof, hydroxyl, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfonyl, alkoxyalkyl, alkylsulfinyl, aryl, arylamino, diarylamino, alkylamino, dialkylamino, alkylarylamino, arylthio, heteroaryl, arylsulfinyl, alkoxycarbonyl, arylsulfonyl, acid functional groups, such as sulfonic acid, carboxylic acid, phosphonic acid, phosphinic acid, phosphoric acid, sulfinic acid and the derivatives thereof, such as salts, eaters, and the like; halogen, nitro, cyano, or alkyl or phenyl substituted with one or more of acid functional groups, such as sulfonic acid, carboxylic acid, phosphonic acid, phosphoric acid, phosphinic acid, sulfinic, acid and the derivatives thereof, such as salts, esters, and the like; halo, amino, nitro, hydroxyl, cyano, or epoxy moieties, or derivatives of a moiety of the formula:

—$(OR'_{15})_r OR'_{16}$ wherein:

$R'_{15}$ is a divalent alkylene moiety having from 1 to about 7 carbon atoms;

$R'_{16}$ is alkyl having from 1 to about 20 carbon atoms; and r is a natural number from 1 to about 50; or $R'_1$ and $R'_2$, or $R'_3$ and $R'_4$, or $R'_5$ and $R'_6$, or $R'_7$ and $R'_8$, or $R'_9$ and $R'_{10}$, or $R'_{11}$ and $R'_{12}$, or $R'_{13}$ and $R'_{14}$ substituents taken together may form an alkylene, alkenylene, or alkynylene group completing a 3, 4, 5, 6, 7, 8, 9 or 10 membered aromatic or alicyclic carbon ring, which ring may optionally include one or more degrees of unsaturation or one or more heteroatoms of nitrogen, sulfur, phosphorus, selenium, sulfinyl, sulfonyl or oxygen; and $X_1$ and $X_2$ are the same or different and are S, O, Se, $NR'_{17}$, $PR'_{17}$ or $CR'_{17}R'_{18}$, wherein $R'_{17}$ and $R'_{18}$ are hydrogen, alkylaryl, arylalkyl, alkyl or $R_1$.

Illustrative of useful $R'_1$, $R'_3$, $R'_4$, $R'_5$, $R'_6$, $R'_7$, $R'_8$, $R'_9$, $R'_{10}$, $R'_{11}$, $R'_{12}$, $R'_{13}$, and $R'_{14}$ groups are hydrogen; hydroxyl; cyano; nitro; halo; alkyl such as methyl, ethyl, butyl, pentyl, octyl, nonyl, tert-butyl, neopentyl, isopropyl, sec-butyl, dodecyl and the like, alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio, and the like; such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; alkylamino and dialkylamino such as dimethylamino, methylamino, diethylamino, ethylamino, dibutylamino, butylamino and the like; cycloalkyl such as cyclohexyl, cyclopentyl, cyclooctyl, cycloheptyl and the like; alkoxyalkyl such as methoxymethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxy-butyl, cyanomethyl, 3-chloropropyl, 4-nitrophenyl, 3-cyanophenyl, 1-hydroxymethyl, and the like; hydroxyl terminated alkyl and aryl groups such as 2-hydroxy ethyl, 4-hydroxy butyl and 4-hydroxy phenyl; sulfonic acid, carboxylic acid and phosphoric acid terminated alkyl and aryl groups such as ethylsulfonic acid, propylsulfonic acid, butylsulfonic acid, phenylsulfonic acid, and the corresponding carboxylic and phosphoric acids and derivatives of said sulfonic, carboxylic and phosphoric acids as for example salts, esters and the like. Exemplary of other useful $R'_1$ to $R'_{14}$ groups are moieties of the formula:

—$(OR'_{15})_r OR'_{16}$ where r, $R'_{15}$ and $R'_{16}$ are as described above. Useful $R'_{15}$ groups include divalent moieties of the formulas —$(CH_2)_2$—, —$(CH_2)_3$—, —$(CH_2)_4$—, and —$(CH_2CH(CH_3))$—, and useful $R'_{16}$ groups include —$CH_3$, —$CH_2CH_3$ and —$(CH_2)_8 CH_3$. Illustrative of substituents having such $R'_{15}$ and $R'_{16}$ are ethyleneglycol monomethylether, diethylene glycol monomethylether, triethylene glycol monomethylether, tetraethylene glycol monomethylether, and the like.

Illustrative of $R'_{17}$ groups are hydrogen, methyl, ethyl, propyl, hexyl, octyl, nonyl, phenyl, benzyl, vinyl, allyl, dodecylphenyl, phenethyl, phenylpropyl, 2,4-dimethylphenyl, 4-methylphenyl and the like.

Figure 3:
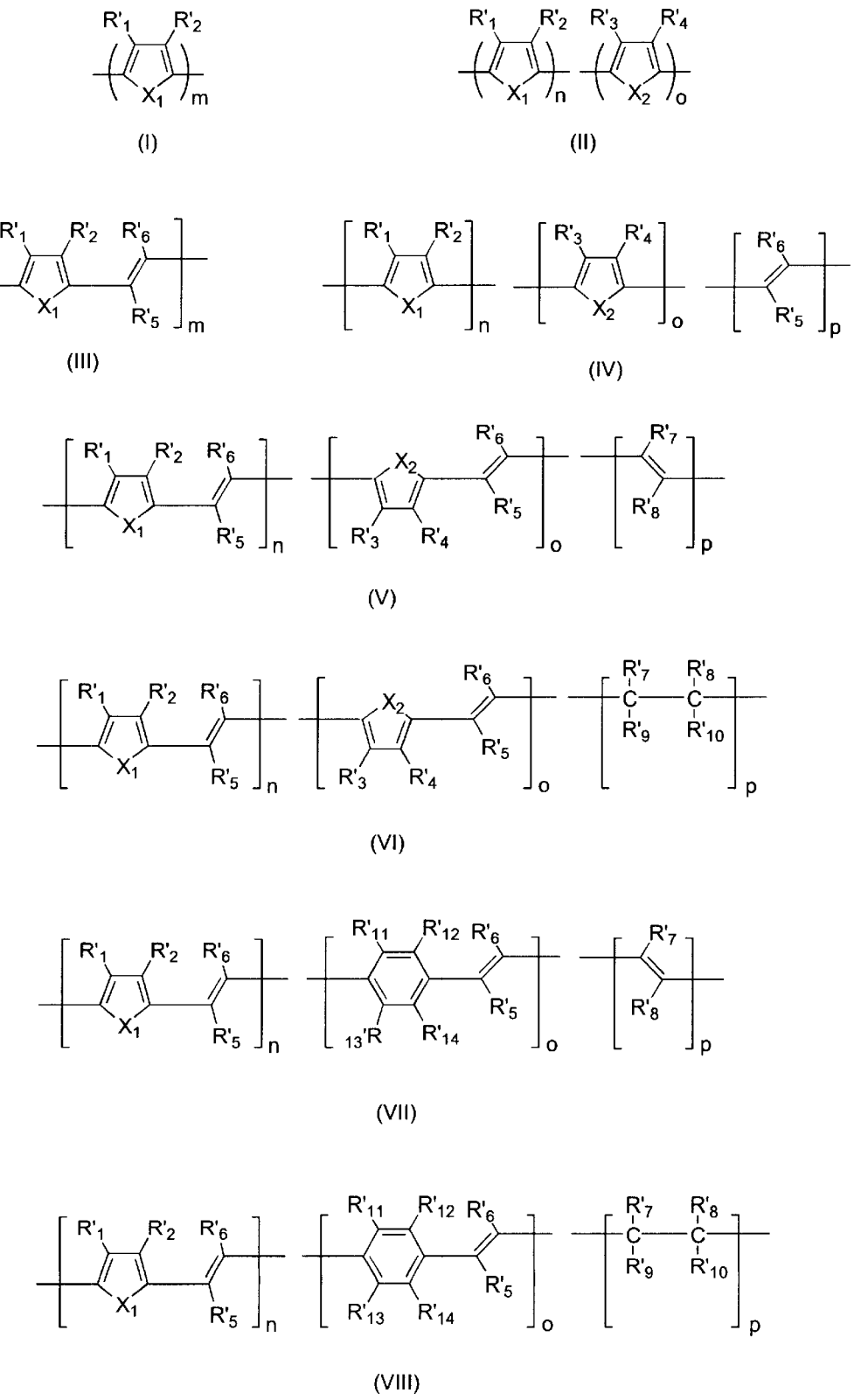
FIGS. 3, 4, 5 and 6 are diagrams illustrating chemicals used in various embodiments of the present invention.
Figure 4:
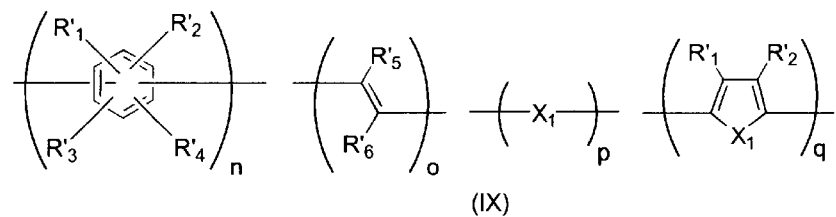
Figure 4:
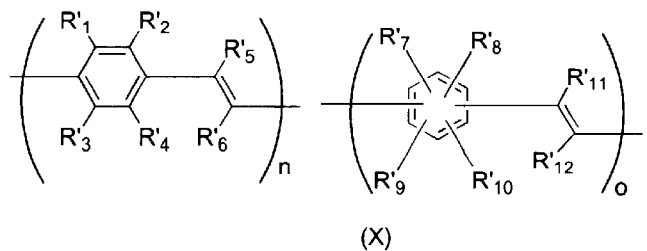
Figure 4:
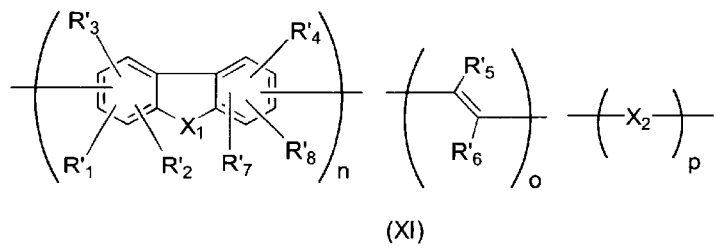
Figure 4:
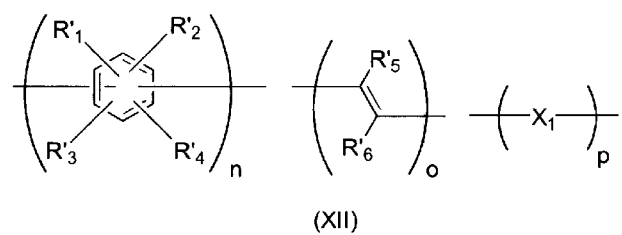
Figure 4:
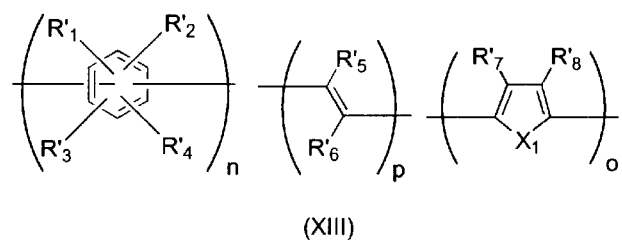
Figure 4:
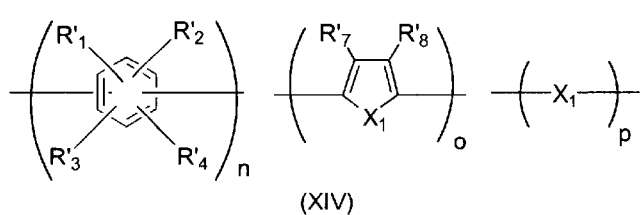

Preferred polymers for use in the practice of this invention are homopolymers, and random or block copolymers of the above Formulas I to XIV of FIGS. 3 and 4 in which:

m, and the sum of n, o, p and q are natural numbers at least about 20, with the proviso that at least one of n or o is not zero;

$R'_1$, $R'_2$, $R'_3$ and $R'_4$ are the same or different at each occurrence and are hydrogen or hydroxyl or alkyl having from 1 to about 20 carbon atoms, such as methyl, ethyl, propyl, isopropyl, n-butyl, sec-butyl, isobutyl, n-pentyl, isopentyl, sec-pentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkxoy having from 1 to about 12 carbon atoms such as methoxy, ethoxy, and propoxy; alkanoyl having from 1 to 20 carbon atoms such as formyl, acetyl, and propionyl; alkylthio, having from 1 to 20 carbon atoms such as methylthio, ethylthio, propylthio, dodecylthio and butylthio; alkoxyalkyl having from 1 to 20 carbon atoms such methoxymethyl, ethoxyethyl and heptoxypropyl; alkenyl having from 1 to about 20 carbon atoms such as allyl, vinyl and 3-butenyl; or aryl and alkyl substituted with phosphonic acid and derivatives thereof, cyano, nitro, epoxy, hydroxyl, carboxylic acid and derivatives, sulfonic acid and derivatives, or halo substituents, such as trifluoromethyl, 3,4-epoxybutyl, cyanomethyl, 2-nitroethyl, 3-chloropropyl, 4-nitrophenyl, hydroxyethyl, —$CH_2CH_2CH_2SO_3H$; —$CH_2CH_2CH_2P(O)(OH)_2$; and —$CH_2CH_2CH_2CO_2H$; or moiety of the formula:

—$(OR'_{15})_rOR'_{16}$ wherein:
$R'_{15}$ is divalent alkylene having from 1 to about 4 carbon atoms;
$R'_{16}$ in alkyl having from 1 to about 10 carbon atoms; and
r in a natural number from 1 to about 25 such as ethylene glycol monomethylether and the like; or any of $R'_1$, and $R'_2$, or $R'_3$ and $R'_4$, substituents taken together may form an alkylene, alkenylene or alkynylene chain having from 2 to 20 carbon atoms completing a 4, 5, 6, 7, 8, 9 or 10 membered ring system(s) which may include one or more degrees of unsaturation or one or more heteroatoms of oxygen, nitrogen or sulfur such as 1,4-butanediyl, 1,2-ethanediyl, —$CH_2SCH_2$—, —$CH_2OCH_2$—, —$CH_2CH_2$—NH—$CH_2$—, or —$CH_2CH_2$—$NH_2$—;
$R'_5$ to $R'_{14}$ are the same or different at each occurrence and hydrogen or hydroxyl or alkyl having from 1 to about 12 carbon atoms, phenyl, alkylthio having from 1 to about 12 carbon atom or alkoxy having from 1 to about 12 carbon atoms; alkoxyalkyl having from 2 to about 12 carbon atoms; alkylamino having about 1 to about 12 carbon atoms alkyl; or phenyl substituted with hydroxyl, acid functional groups, such as sulfonic acid, carboxylic acid, phosphonic acid, phosphoric acid, phosphinic acid, sulfinic acid and the derivatives thereof, such as salts, esters, and the like; cyano, nitro, epoxy, or halo substituents, or any of $R'_5$, and $R'_6$, or $R'_7$ and $R'_8$, or $R'_9$ and $R'_{10}$, or $R'_{11}$ and $R'_{12}$, or $R'_{13}$ and $R'_{14}$ substituents together may form an alkenylene, alkynylene or alkylene chain having 2 to about 20 carbon atoms completing a 4, 5, 6, 7, 8, 9 or 10 membered ring system(s) which may include one or more degrees of unsaturation or one or more heteroatoms of oxygen, sulfur, or nitrogen such as 1,4-butanediyl, 1,2-ethanediyl, —$CH_2SCH_2$— or —$CH_2OCH_2$—; and
$X_1$ and $X_2$ are the same or different and are oxygen, sulfur, $NR'_{17}$ or $CR'_{17}R'_{18}$, wherein $R'_{17}$ and $R'_{18}$ are hydrogen or alkyl or aryl.

Preferred for use in the practice of this invention are homopolymers and random copolymers of the above-referenced Formula I to XIV, wherein:

m, and the sum of n, o, p and q are at least about 40 with the proviso that at least one of n or o is not zero;
$R'_1$, $R'_2$, $R'_3$ and $R'_4$ are the same or different at each occurrence and are hydrogen; hydroxyl; alkyl having from 1 to about 12 carbon atoms such as ethyl, methyl, propyl, n-butyl, sec-butyl, n-hexyl, n-octyl, and n-dodecyl; phenyl; alkoxy or alkylthio having from 1 to about 12 carbon atoms such as methylthio, ethylthio, propylthio, butylthio, methoxy, ethoxy and 1 to about 12 carbon atoms such as methylthio, ethylthio, propylthio, butylthio, methoxy, ethoxy and butoxy; alkoxyalkyl having from 1 to about 12 carbon atoms; or a moiety of the formula:

—$(OR'_{15})_rOR'_{16}$ wherein:
$R'_{15}$ is alkylene of about 2 to 3 carbon atoms;
$R'_{16}$ is alkyl of from 1 to about 10 carbon atoms; and
r is a natural number from 1 to about 10;
$R'_5$, $R'_6$, $R'_7$, $R'_8$, $R'_9$, $R'_{10}$, $R'_{11}$, $R'_{12}$, $R'_{13}$ and $R'_{14}$ are the same or different at each occurrence and are hydrogen; hydroxyl; alkyl, such as methyl, ethyl or the like; substituted alkyl such as butylsulfonic acid, propylsulfonic acid, cyanomethyl, epoxybutyl, pentafluoroethyl, nitropropyl, and butylcarboxylic acid; alkoxy such as methoxy, ethoxy, butoxy, and the like; and alkylthio such as methylthio, ethylthio and the like; or any of $R'_5$, and $R'_6$, $R'_7$ and $R'_8$, $R'_9$ and $R'_{10}$, or $R'_{11}$ and $R'_{12}$, or $R'_{13}$ and $R'_{14}$ together may be an alkenylene or alkylene chain forming an alicyclic, aromatic or heteroaromatic ring;
$X_1$, and $X_2$ are the same or different and are oxygen, sulfur, $NR'_{17}$ or $CR'_{17}R'_{18}$ wherein $R'_{17}$ and $R'_{18}$ are hydrogen or alkyl having from 1 to about 10 carbon atoms.

Among the embodiments, preferred are copolymers and homopolymers of Formula I to XIV in which:

m, or the sum of n, o, p and q is at least about 50 with the proviso that at least one of n or o is not zero;
$R'_1$ to $R'_4$ are the same or different at each occurrence and are hydrogen, or alkyl, alkoxy or —$(OR'_{15})_rOR'_{16}$ wherein:
$R'_{15}$ is —$(CH_2)_2$— or —$(CH_2CH(CH_3))$—;
$R'_{16}$ is —$CH_3$ or —$CH_2CH_3$; and
r is a natural number 1 to about 6;
$R'_5$, $R'_6$, $R'_7$, $R'_8$, $R'_9$, $R'_{10}$, $R'_{11}$, $R'_{12}$, $R'_{13}$ and $R'_{14}$, are the same or different at each occurrence and are hydrogen, hydroxyl, alkyl, alkoxy, or any of $R'_5$ and $R'_6$, $R'_7$ and $R'_8$, $R'_9$ and $R'_{10}$, or $R'_{11}$ and $R'_{12}$, or $R'_{13}$ and $R'_{14}$ together may form a divalent alkylene or alkenylene chain forming an alicyclic, aromatic and/or heteroaromatic ring; and
$X_1$, and $X_2$ are sulfur, $NR'_{17}$ or $CR'_{17}R'_{18}$ wherein $R'_{17}$ and $R'_{18}$ are hydrogen or alkyl having from 1 to about 7 carbon atoms.

Still other preferred electrically conductive polymers are polyanilines. As used herein, "polyanilines" are homopolymers or copolymers in which at least 50 mole % of the recurring backbone monomeric units in vary ratio are selected from the group consisting of substituted or unsubstituted phenyl rings and amine linkages (—NH— or —NR— where R is substituent other than hydrogen) with varying amounts of substituted or unsubstituted quinoid rings and imine (—N=) linkages.

Any form of such polyanilines can be conveniently used in the practice of this invention. Illustrative of useful forms are those described in Green, A. G. and Woodhead, A. E., CXVII-Aniline-black and Allied Compounds, Part II", *J. Chem. Soc.* 101, pp. 1117 (1912) and in Kobayashi, et al., "Electrochemical Reactions . . . of Polyaniline Film-Coated Electrodes", *J. Electroanal. Chem.*, 177, pp. 281–91 (1984) and in Shacklette, L. W., et al. "Structure and Properties of Polyaniline as Modeled by Single-Crystal Oligomers", *J. Chem. Phys.*, 88, pp. 3955 (1988), which are hereby incorporated by references.

In the preferred embodiments, the polymer is polyaniline. As used herein, the polyaniline consists of repeat units of the Formulas XV or XVI of FIG. 5, a combination thereof having various ratios of the above repeat units in the polyaniline backbone such as leucoemeraldine, protoemeraldine, emeraldine, nigraniline and pernigraniline.

Figure 5:
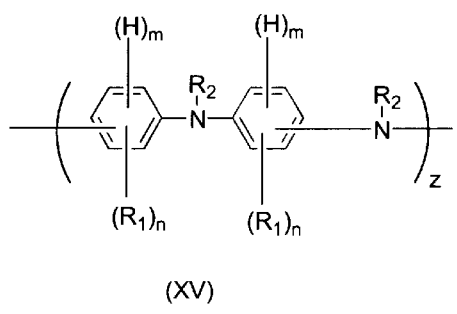
Figure 5:
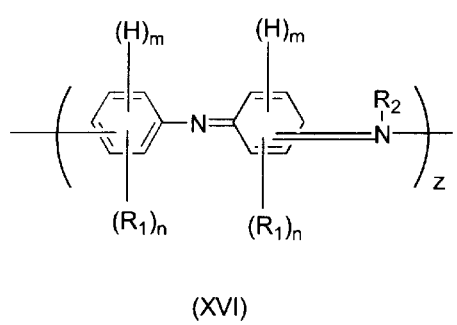
Figure 5:
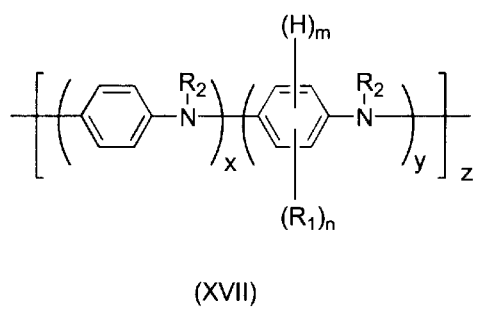
Figure 5:
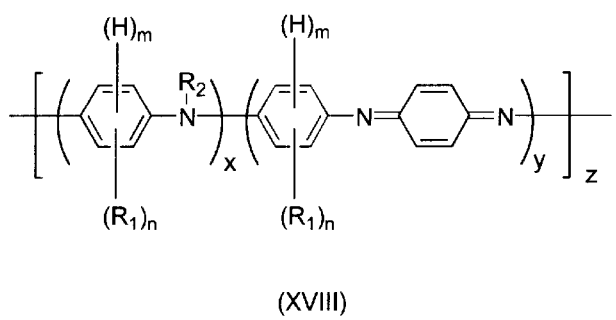
Figure 5:
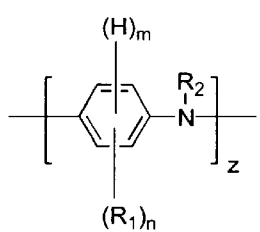
Figure 5:
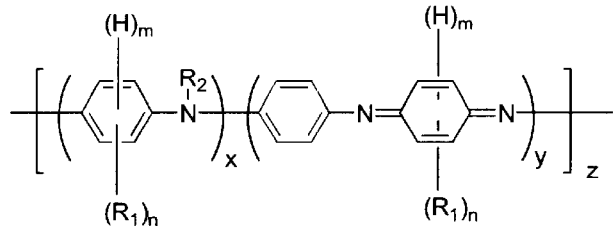

Illustrative of these preferred polyanilines useful in the practice of this invention are those of the Formulas XVII to XX of FIG. 5;
wherein:

n, m, $R_1$ and $R_2$ are as described above;

x and y are the same or different at each occurrence and are integers equal to or greater than 0, with the proviso that the sum of x and y is greater than 0, preferably were x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than 1.

Preferred for use in the practice of this invention are polyanilines of the above Formulas XVII to XX in which:

n is an integer from 0 to about 3;

m is an integer from 1 to 4, with the proviso that the sum of n and m is equal to 4;

$R_1$ is alkyl, aryl, arylthio, alkylthio or alkoxy having from 1 to about 30 carbon atoms, sulfinic acid, sulfinate, sulfinic acid salt, amino, alkylamino, dialkylamino, arylamino, diarylamino, hydroxyamino, hydroxy, nitro, phosphinate alkylsulfonyl, arylsulfonyl, sulfonic acid, sulfonate, phosphinic acid, phosphinic acid salt, phosphinate, carboxylic acid, carboxylate, phosphonic acid, phosphonate, phosphonic acid salt, cyano, halo, or alkyl, aryl, arylthio, alkylthio or alkoxy substituted with one or more phosphonic acid, phosphoric acid, borate, sulfonate, carboxylate, phosphonate, phosphonic acid salt, boric acid, phosphinic acid, phosphinate, phosphinic acid salt, sulfinic acid, sulfinate, sulfinic acid salt, carboxylic acid or sulfonic acid substituents;

$R_2$ is the same or different at each occurrence and is hydrogen, $R_1$, alkyl, aryl, or aryl or alkyl substituted with sulfonic acid, sulfonate, phosphinic acid, phsophinate, phosphonic acid salt, carboxylic acid, carboxylate, sulfinic acid, sulfinate, sulfinic acid salt, boric acid, borate, phosphonic acid, phosphonate, phosphonic acid salt substituents;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are polyanilines of the above Formulas XVII to XX in which:

n is an integer from 0 to 2;

m is an integer from 2 to 4, with the proviso that the sum of n and m is equal to 4;

$R_1$ is alkyl, alkoxy, arylthio, alkythio, amino, alkylamino, dialkylamino, arylamino, diarylamino, hydroxyamino, hydroxy, alkylsulfonyl, arylsulfonyl, carboxylic acid, carboxylate, phosphinic acid salt, phosphinic acid, sulfonic acid, sulfonate, sulfinic acid, phosphonic acid, sulfinic acid salt, phosphonic acid salt, or alkyl substituted with carboxylic acid, phosphinic acid, sulfinic acid, phosphinic acid salt, halo, sulfinic acid salt, sulfonate, carboxylate, phosphonic acid, phosphonic acid salt, or sulfonic acid substituents; wherein the aliphatic components of $R_1$ substituents include from 1 to about 30 carbon atoms and the aryl components of any $R_1$ substituent include from 6 to about 30 carbon atoms;

$R_2$ is the same or different at each occurrence and is hydrogen or $R_2$, alkyl, hydroxy, alkylsulfonyl, arylsulfonyl, or $R_2$, or alkyl substituted with one or more carboxylic acid, sulfinic acid, sulfinic acid salt, carboxylate, phosphinic acid salt, phosphinic acid, sulfonic acid, sulfinate salt, phosphonic acid or phosphonic acid salt substituents; wherein the aliphatic components of any $R_2$ substituent include from 1 to about 30 carbon atoms and the aryl components of any $R_2$ substituent include from 6 to 30 carbon atoms;

x is an integer equal to or greater than 2;

y is equal to or greater than 0, with the proviso that the ratio of x to y is greater than about 1; and z is an integer equal to or greater than about 10.

In the preferred embodiments of this invention, the polyaniline is derived from aniline or N-alkylaniline either unsubstituted or substituted with at least one sulfonate, sulfonic acid, alkyl or alkoxy. Polyaniline derived from unsubstituted aniline polyaniline of choice.

In general, the number of repeat units in the conjugated backbone homopolymer or copolymer repeat units are not critical and may vary widely. The greater the number of repeat units the greater the viscosity and molecular weight of the conjugated backbone homopolymer or copolymer. In those applications where a conjugated backbone homopolymer or copolymer of relatively low molecular weight and viscosity is required, such materials may be used, and in those applications where a conjugated backbone homopolymer or copolymer of relatively high molecular weight and viscosity is required, then such materials can be used. The number of repeat units is at least about 10. The upper limit can vary widely depending on the desired molecular weight and viscosity and the required degree of processibility, such as melt processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

Conjugated backbone homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782 and "The Handbook of Conducting Polymers", edited by Terje A. Skotheim, Marcell Dikker, Inc. New York and Basel and references cited therein, all of which is hereby incorporated by reference. For example, preferred polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is purple in color and which has a conductivity of less than $10^{-10}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517. Likewise, unsubstituted polypyrrole can also be prepared by treating pyrrole with ammonium persulfate, $(NH_4)_2S_2O_8$, or with ferric chloride ($FeCl_3$) in excess 1M HCl.

Useful forms of polyaniline, polypyrrole or other conducting polymers (such as polyaromatics or polyheteroaromatics) can also be prepared electrochemically. For example, useful forms of polyaniline or polypyrrole can be prepared by the electrochemical oxidation of aniline or pyrrole, respectively, in aqueous fluoroboric acid electrolyte on a platinum foil anode.

Other chemical and electrochemical syntheses and transformations of polyaniline, polypyrrole or other conducting polymers may be discovered and are presently contemplated as being useful. Moreover, additional forms or types of polyaniline may be elucidated in the future. Accordingly, no limitation to the syntheses, transformation, or structures herein described or postulated is intended beyond the limitations or equivalents of the appended claims.

The conjugated backbone homopolymer or copolymer, as used in this invention, can be either in the neutral undoped (nonconductive) form(s) or in the conductive and doped forms with various doping degrees.

In the case of conductive and doped forms, the conjugated backbone homopolymer or copolymer can be doped with a suitable dopant to render the polymer electrically conductive. Dopants for use in general can be such materials which are known in the art for use in doping conjugated backbone homopolymer or copolymers to form conductive or semiconductive polymers, such as oxidizing dopants can be used. Illustrative of useful oxidizing dopants are $AsF_5$, $NO^+$ and $NO_2^+$ salts (such as $NOBF_4$, $NOPF_6$, $NOSbF_6$, $NOAsF_6$, $NO_2BF_4$, $NO_2PF_6$, $NO_2A_sF_6$, $NO_2SbF_6$, and the like), $HClO_4$, $HNO_3$, $H_2SO_4$, $SO_3$, $I_2$, and Fe(III) salts (such as $FeCl_3$, $Fe(OTs)_3$, $Fe(CF_3SO_3)_3$, and the like). Illustrative of other dopants are protonic acid dopants. Such dopants include inorganic acids, such as hydrofluoric acid, hydroiodic acid, phosphoric acid, nitric acid, boric acid, sulfuric acid and the like. Other protonic acid dopants are organic acids, such as aryl or alkyl compounds containing sulfonic acid, sulfinic acid, carboxylic acid, phosphonic acid, phosphinic acid, or boric acid moieties.

C. Illustrative Examples of Monomers for Reaction Coating

The composite fiber of the present invention can be prepared by coating the core fiber with an organic polymer via a reaction coating process, by placing the core fiber in a reaction solution that contains a monomer of the organic polymer and a chemical reagent capable of initiating or inducing monomer polymerization. When the coating material is a non-conjugated polymer, then the monomer is preferably selected from the group comprising of substituted or unsubstituted acrylonitriles, substituted or unsubstituted vinyl chlorides, substituted or unsubstituted vinyl alcohols, or substituted or unsubstituted vinyl acetates. When the coating material is a conjugated polymer, then the useful monomers for performing such reaction coating are substituted or unsubstituted anilines, substituted or unsubstituted pyrroles, substituted or unsubstituted thiophenes, substituted or unsubstituted furans, substituted or unsubstituted benzenes, substituted or unsubstituted thiophenols, substituted or unsubstituted acetylenes, or substituted or unsubstituted arylacetylenes, and other aromatics, or heteroaromatics. In the preferred embodiments of this invention, conjugated conducting polymer (homopolymer or copolymer) coating layers are prepared via the reaction coating from their corresponding monomers, as illustrated in the Formula from XXI to XXIV of FIG. 6;

wherein:

k is an integer from 0 to 4, or 5, or 6;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilyl, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together, or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

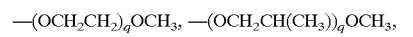

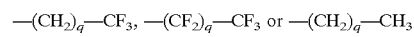

wherein q is a positive whole number; and $R_2$ is selected from the group consisting of permissible $R_1$ substituents and hydrogen.

$X_1$ and $X_2$ are the same or different and are S, O, Se, $NR_4$, $PR_4$, or $CR_5R_6$, wherein $R_4$, $R_5$, and $R_6$ are the same or different at each occurrence and are hydrogen, alkylaryl, arylalkyl, alkyl or $R_1$.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenyl-amino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups, or a $R_1$ group with a $R_2$ group, or a $R_1$ group with a $R_4$, or a $R_5$, or a $R_6$ group such as moieties having from about 2 to about 7 repeat units in various combination and various occurrence order of the following formula:

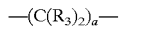

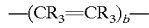

wherein $R_3$ is the same or different at each occurrence and is hydrogen, alkyl, alkoxy, or $R_1$, as for example —(CH$_2$)$_4$—, —(CH$_2$)$_3$—, —(CH=CH—CH=CH)—, —(CH$_2$—CH(CH$_3$)—CH$_2$)— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$— —CH$_2$NHCH$_2$—, —SCH$_2$NHCH$_2$—, —O—CH$_2$—CH$_2$—O—CH$_2$—S—CH$_2$—, —CH$_2$S(O$_2$)CH$_2$—, —CH$_2$S(O)CH$_2$—, —OC(O) CH$_2$ CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydrobenzothiazineamine, benzothiopyranamine, dihydrobenzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepineamine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothiopyran, aminobenzodiazine, benzthiopyrone amine, aminocoumarin, benzothiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like, arylsulfonyl such as phenylsulfonyl, p-methylphenylsulfonyl, naphthylsulfonyl and the like.

In the preferred embodiments of this invention, conjugated conducting polymer (homopolymer or copolymer) skin layers are prepared via the reaction coating from their corresponding monomers, as illustrated in the Formula from XXI to XXIV:

k is an integer from 0 to about 2;

$R_1$ is aryl, alkyl, alkylthio, arylthio, or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, nitro, alkythio, arylthio, diarylamino, alkylarylamino, or alkyl, aryl, alkylthio, arylthio, or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents; and $R_2$ is the same or different at each occurrence and is a $R_1$ substituent or hydrogen.

$X_1$ and $X_2$ are the same or different and are S, O, NR$_4$, PR$_4$, or CR$_5$R$_6$, wherein R$_4$, R$_5$, and R$_6$ are the same or different at each occurrence and are hydrogen, alkylaryl, arylalkyl, alkyl or $R_1$.

Figure 6:
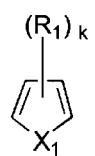
Figure 6:
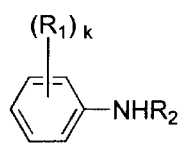
Figure 6:
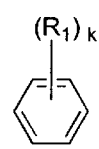
Figure 6:
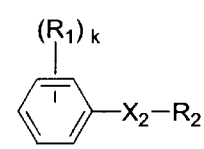

In the particularly preferred embodiments of this invention, conjugated conducting polymer (homopolymer or copolymer) skin layers are prepared via the reaction coating from their corresponding monomers, as illustrated in the Formula from XXI to XXIV of FIG. 6; wherein:

k is an integer from 0 to 1;

$R_1$ is aryl, alkyl, alkylthio, arylthio, or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl, alkylthio, arylthio, or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents; and $R_2$ is the same or different at each occurrence and is a $R_1$ subsituent or hydrogen.

$X_1$ and $X_2$ are the same or different and are S, O, $NR_4$, or $CR_5R_6$, wherein $R_4$, $R_5$, and $R_6$ are the same or different at each occurrence and are hydrogen, alkylaryl, arylalkyl, alkyl or $R_1$.

While the present invention has been particularly shown and described with reference to the preferred embodiments thereof, the embodiments are not intended to be exhaustive or to limit the present invention to the precise forms disclosed herein. It will be understood by those skilled in the art that various changes in form and detail may be made therein without departing from the spirit and scope of the invention. Similarly, any process steps described may be interchangeable with other steps in order to achieve the same result. The scope of the present invention is defined by the following claims and their equivalents.

I claim:

1. A carbon tube, comprising a tube wall, wherein said tube wall consists essentially of carbonized coating material and fiber residue, and said carbonized coating material is prepared according to a process comprising the steps of:
   (a) coating a fiber with a carbonizable carbon-containing coating material to form a coating layer over the fiber;
   (b) removing the fiber; and
   (c) carbonizing the coating layer to form said carbonized coating material.

2. The carbon tube according to claim 1, wherein said carbon-containing coating material comprises repeating units selected from the group consisting of substituted polyacrylonitriles, unsubstituted polyacrylonitriles, substituted poly(vinyl chlorides), unsubstituted poly(vinyl chlorides), substituted poly(vinyl acetates), and unsubstituted poly(vinyl acetates).

3. The carbon tube according to claim 1, wherein said carbon-containing coating material comprises conjugated polymers selected from the group consisting of doped and undoped conjugated homopolymers, doped and undoped conjugated copolymers.

4. The carbon tube according to claim 1, wherein said fiber is a carbon-containing fiber, and said tube wall consists essentially of carbonized coating material and carbonized fiber residue.

5. A device, comprising a two dimensional carbon tube structure with a tube wall, wherein said tube wall consists essentially of carbonized coating material and fiber residue, and said carbonized coating material is prepared according to a process comprising the steps of:
   (a) coating a two dimensional fiber with a carbonizable carbon-containing coating material;
   (b) removing the fiber; and
   (c) carbonizing the carbon-containing coating material to form said carbonized coating material.

6. The device according to claim 5, wherein said carbon-containing coating material comprises repeating units selected from the group consisting of substituted polyacrylonitriles, unsubstituted polyacrylonitriles substituted poly(vinyl chlorides), unsubstituted poly(vinyl chlorides), substituted poly(vinyl acetates), and unsubstituted poly(vinyl acetates).

7. The device according to claim 5, wherein said carbon-containing coating material comprises conjugated polymers selected from the group consisting of doped and undoped conjugated homopolymers, doped and undoped conjugated copolymers.

8. The device according to claim 5, wherein said fiber is a carbon-containing fiber, and said tube wall consists essentially of carbonized coating material and carbonized fiber residue.

9. A device, comprising a three dimensional carbon tube structure with a tube wall, wherein said tube wall consists essentially of carbonized coating material and fiber residue, and said carbonized coating material is prepared according to a process comprising the steps of:
   (a) coating a three-dimensional fiber structure with a carbonizable carbon-containing coating material;
   (b) removing the fiber structure; and
   (c) carbonizing the carbon-containing coating material to form said carbonized coating material.

10. The device according to claim 9, wherein said carbon-containing coating material comprises repeating units selected from the group consisting of substituted polyacrylonitriles, unsubstituted polyacrylonitriles, substituted poly(vinyl chlorides), unsubstituted poly(vinyl chlorides), substituted poly(vinyl acetates), and unsubstituted poly(vinyl acetates).

11. The device according to claim 9, wherein said carbon-containing coating material comprises conjugated polymers selected from the group consisting of doped and undoped conjugated homopolymers, doped and undoped conjugated copolymers.

12. The device according to claim 9, wherein said fiber structure consists essentially of a carbon-containing fiber, and said tube wall consists essentially of carbonized coating material and carbonized fiber residue.

* * * * *